United States Patent [19]

Nakata

[11] Patent Number: 4,741,650
[45] Date of Patent: May 3, 1988

[54] TOOL HOLDER
[75] Inventor: Kenji Nakata, Kawaguchi, Japan
[73] Assignee: Hiroshi Sasaki, Hokkaido, Japan
[21] Appl. No.: 930,444
[22] Filed: Nov. 5, 1986
[30] Foreign Application Priority Data
  Nov. 30, 1985 [JP] Japan .............................. 60-269845
[51] Int. Cl.$^4$ ............................................ B23B 47/00
[52] U.S. Cl. .................................... 408/137; 408/126
[58] Field of Search .............. 408/129, 127, 138, 139,
       408/140, 141, 137, 142, 9, 126, 23; 409/230,
                      231, 232, 234; 82/7, 29 R; 279/1 A

[56] References Cited
U.S. PATENT DOCUMENTS

| 3,303,522 | 2/1967 | Kunabe et al. | 408/128 |
| 3,752,595 | 8/1973 | Woythal et al. | 279/1 A |
| 4,077,736 | 3/1978 | Hutchen | 279/1 A |
| 4,124,327 | 11/1978 | Yoshida et al. | 409/231 |
| 4,529,044 | 7/1985 | Klueber et al. | 408/9 |

Primary Examiner—Z. R. Bilinsky
Attorney, Agent, or Firm—Wenderoth, Lind & Ponack

[57] ABSTRACT

A tool holder has a prime shaft which receives an external torque and is partly accommodated in and partly projects from a casing; a speed reduction unit having a coaxial three-layer structure consisting of a wave generator, a flexible spline and a circular spline being disposed in said casing, the wave generator being connected to the prime shaft in the casing, of the flexible spline and circular spline, one is secured to the casing while the other is an output section; a rotary holder secured to the output section; a tool holder mounting shaft supported by a top end of the rotary holder, the tool holder mounting shaft having a top end portion projecting from the casing; a crankshaft rotatably provided within the inner wall of the rotary holder; crank arms secured to both ends of the crankshaft, one of the crank arms being eccentrically coupled to the wave generator, the other the crank arms being eccentrically coupled to the rear end of the tool holder mounting shaft, with respective axes positioned eccentric to each other. The tool holder mounting shaft is swung with the rotation of the wave generator through the crank arms and crankshaft, and undergoes rotation through the rotary holder with the rotation of the output section of the speed reduction unit.

6 Claims, 3 Drawing Sheets

TOOL HOLDER

BACKGROUND OF THE INVENTION

1. Field of the Invention

This invention relates to a tool holder for tapping and boring using a swinging cutting method, which can be used for a tapping machine, a reaming machine, a machining center, etc.

2. Description of the Prior Art

Heretofore, known tapping operations have not been sufficiently smooth to discharge cutting dust. In addition, the cutting tool is liable to be broken by excessive resistance offered against cutting. Therefore, the tapping operation has been regarded as troublesome, and particular attention has been required when tapping to form a small diameter thread.

Various research and investigations have been conducted to facilitate the tapping operation, and a swinging cutting method has been developed, which is thought to be the most effective method. The swinging cutting method is one in which a tapping operation is performed by causing forced swinging of the cutting blade (or tap) or workpiece. It is well known in the art that when this method is employed, the theoretical resistance offered against cutting is reduced, the discharge of the cutting dust is improved, satisfactory tapping free from formation of burrs can be obtained, and even small diameter threads can be readily formed. A great variety of tapping machines, reaming machines, tool holders, etc. which adopt the swinging cutting method have been developed.

In the prior art apparatus, however, the cutter blade is rotated while the workpiece is swung by the provision of separate drive sources for rotating the cutter blade and swinging the workpiece. Therefore, the apparatus is inevitably complicated in construction and increased in size. An apparatus also has been developed which uses a single drive source for both rotating and swinging the cutter blade. In this case, however, the rotation and the swinging of the cutter blade are not smooth. In addition, the speed of swinging is close to that of rotation. Therefore, it is impossible to obtain theoretical effects of the swinging. The apparatus, therefore, lacks practicality, and its practical use is substantially infeasible.

SUMMARY OF THE INVENTION

The inventor of the present invention has long studied the swinging cutting method and has established the swinging cutting theory. Furthermore, he has performed research and investigations with an aim of putting the theory to practical use. As a result, the present invention is based on such research and is drawn to a tool holder for tapping and boring by the swinging cutting method, which can sufficiently exhibit the effects of the swinging cutting method and can be used for a tapping machine, a reaming machine, a machining center, etc.

According to the invention, there is provided a tool holder which comprises a wave generator of a speed reduction unit consisting of a coaxial three-layer structure, a flexible spline and a circular spline disposed in a casing and coupled to a prime shaft projecting from one end of said casing and receiving an external torque, one said flexible spline or circular spline being secured to said casing while the other constitutes an output section, a rotary holder secured to said output section, a tool holder mounting shaft supported by a top end of said rotary holder such that said tool holder mounting shaft is coaxial with said prime shaft, said tool holder mounting shaft having a top end portion projecting from said casing, a crankshaft provided in the inner wall of said rotary holder in such a manner that said crankshaft rotates freely around its axis at an eccentric position with respect to said prime shaft, crank arms secured to the both ends of said crankshaft, one of said crank arms being eccentrically coupled to said wave generator, the other of said crank arms being eccentrically coupled to the rear end of said tool holder mounting shaft, with respective axes positioned eccentric to each other, and said tool holder mounting shaft swinging with the rotation of said wave generator through said crank arms and crankshaft, and undergoing rotation through said rotary holder rotated with the rotation of said output section of said speed reduction unit.

When the prime shaft is rotated by external torque, the rotary holder secured to the flexible spline or the circular spline, constituting the output section of the speed reduction unit, is rotated at a predetermined reduced speed. With the rotation of the rotary holder, the tool holder mounting shaft supported by the top end of the rotary holder is rotated. At the same time, the wave generator is rotated at a high speed by directly receiving a high speed rotation of the prime shaft, and a high speed swinging motion of the tool holder mounting shaft in the circumferential directions thereof is caused through one of the crank arm, crankshaft and other crank arm. The tool holder mounting shaft is thus rotated slowly with the rotation of the rotary holder and undergoes a high speed swinging motion about the axis of the tool holder mounting shaft with the swinging motion noted above.

DETAILED DESCRIPTION OF THE PREFERRED EMBODIMENTS

Figure 1:
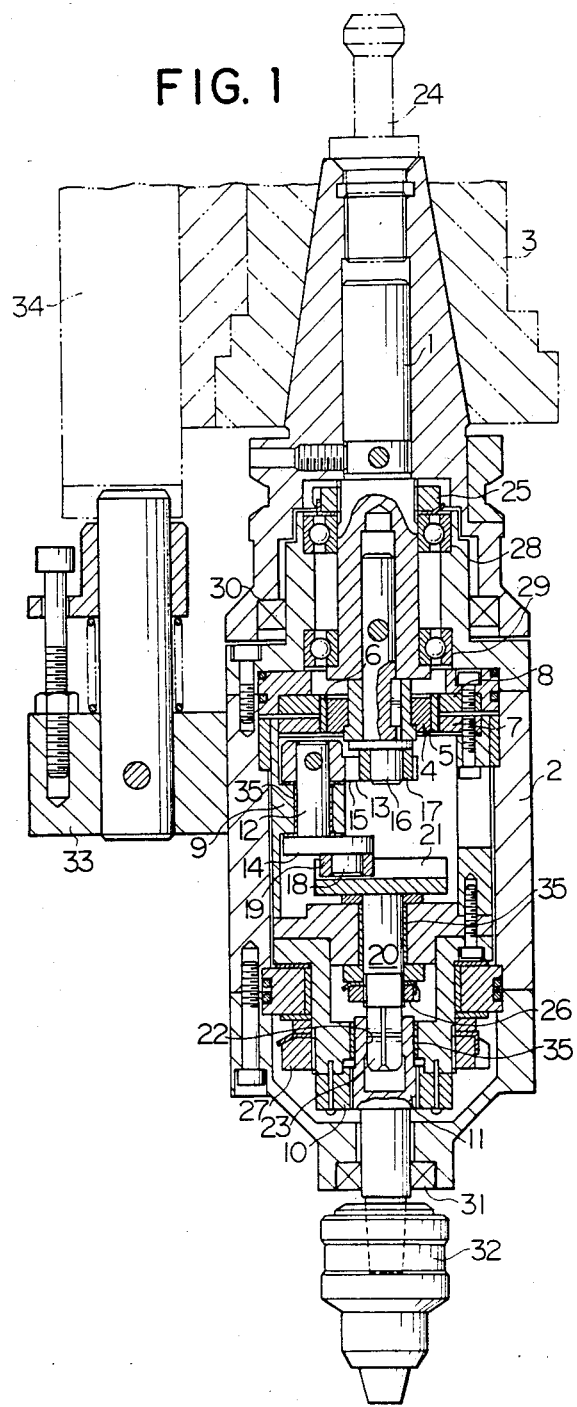
FIG. 1 is an axial sectional view showing one embodiment of the present invention.

The invention will now be described in detail in conjunction with the embodiments illustrated in the drawings.

FIG. 1 shows an embodiment of the invention, which is used for a machining center.

Referring to the drawings, reference numeral 1 designates a prime shaft, i.e. a drive shaft, extending through a casing 2 in the axial direction thereof. The prime shaft 1 is connected to a main shaft 3 of the machining center and is rotated with the rotation of the main shaft 3. Reference numeral 4 designates a speed reduction unit, which is connected to the prime shaft 1 in the casing 2 for reducing the speed of rotation of the prime shaft 1. The speed reduction unit 4 is of a flex mesh type and has a coaxial three-layer structure, consisting of a wave generator 5, a flexible spline 6 and a circular spline 7. It can provide a large speed reduction ratio, and it may be one known as "HARMONIC DRIVE" (Trademark). The wave generator 5 of the speed reduction unit 4 is connected to the prime shaft 1 and constitutes an input section. Of the flexible spline 6 and circular spline 7, when either one of then is stationary, the other constitutes an output section. In this embodiment, the flexible spline 6 is stationary, and the circular spline 7 constitutes an output section. Reference numeral 8 designates a securement circular spline for securing the flexible spline 6. The securement circular spline 8 is secured to the casing 2.

Reference numeral 9 designates a rotary holder which is secured to the circular spline 7 as the output section of the speed reduction unit 4. A top end portion of the rotary holder 9 is provided with a female thread 10 coaxial with the prime shaft 1 and wave generator 5. The pitch of the female thread 10 is not any one pitch in particular when the present invention is used in a boring operation, but in a tapping operation the pitch, is set to be the same as pitch of a thread to be formed. A tool holder mounting shaft 11 is threaded to the female thread 10 such that a top end portion of the tool holder mounting shaft 11 projects from the casing 2.

A crankshaft 12 is provided within the inner wall of the rotary holder 9 such that it is eccentric with the prime shaft 1 and the wave generator 5, and rotatable about its axis. Crank arms 13 and 14 are secured to the both ends of the crankshaft 12. The crank arm 13 is coupled to said wave generator 5, while the crank arm 14 is coupled to said tool holder mounting shaft 11 in such a manner that respective axes are located eccentric to each other in both cases. The crank arm 13 has a longitudinal guide groove 15. The wave generator 5 has an eccentric pin 16. A shoe 17 is fitted on the eccentric pin 16, and is received in the guide groove 15 of the crank arm 13. The shoe 17 is slidable along the guide groove 15 with low friction. When the wave generator 5 is rotated, the shoe 17 is rotated while sliding along the guide groove 15 of the crank arm 13. The rotation of the shoe 17 causes swinging of the crank arm 13 about the crankshaft 12 by an angle corresponding to the eccentricity of the eccentric pin 16. The crank arm 14 which is provided at the other end of the crankshaft 12 has an eccentric pin 18 which is eccentric with respect to the axis of the crankshaft 12 and axis of the tool holder mounting shaft 11 threaded to the top end of the rotary holder 9. A shoe 19 is fitted on the eccentric pin 18. A motion transmission shaft 20 is supported by the rotary holder 9, wherein the shaft 20 is rotatable around its axis coaxially with said tool holder mounting shaft 11. One end of the motion transmission shaft 20 has a head provided with a guide groove 21 extending parallel to the crank arm 14, and the shoe 19 is received in the guide groove 21 for movement along the guide groove 21 with low friction. When the crankshaft 12 is swing about its axis via crank arm 13 with the rotation of the wave generator 5, the crank arm 14 also swings about the crankshaft 12. The shoe 19 swings while sliding along the guide groove 21. The swinging of the shoe 19 causes swinging of the motion transmission shaft 20 about its axis.

The other end of the motion transmission shaft 20 is coupled to the rear end of the tool holder mounting shaft 11. This tool holder mounting shaft 11 is connected to the motion transmission shaft 20 in such a manner that the end of the tool holder mounting shaft 11 is formed with an axial angular bore 22, and the coupled end of the motion transmission shaft 20 is provided with an angular extension 23 having the same shape as the angular bore 22, the angular extention 23 being slidably received in the angular bore 22.

When the prime shaft 1 is rotated, the rotary holder 9 secured to the circular spline 7 as the output section of the speed reduction unit 4 is rotated at a predetermined reduced speed to cause rotation of the tool holder mounting shaft 11 fitted in the female thread 10 formed in the top end portion of the rotary holder 9. At the same time, the rotation of the wave generator 5, which is rotated at a high speed by directly receiving the high speed rotation of the prime shaft 1, causes high speed swinging of the tool holder mounting shaft 11 in its circumferential direction through the crank arm 13, crankshaft 12, crank arm 14 and motion transmission shaft 20. Consequently, the tool holder mounting shaft 11 is rotated slowly with the rotation of the rotary holder 9 and at the same time swings at a high speed with angular extention 23 of the motion transmission shaft 20 moved in the lead angle direction of the female thread 10.

Reference numeral 24 designates a pull stud, numerals 25, 26, 27 designates are nuts, numerals 28, 29 designate bearings, numerals 30, 31 designate oil seals, and numeral 32 designates a chuck provided at the top end of the tool holder mounting shaft 11. Reference numeral 33 designates a rotation prevention member provided on the outer wall of the casing 2. When the tool holder according to the invention is set on the main shaft 3 of the machining center, the rotation prevention member 33 engages a positioning block 34 provided at the machining center, thus preventing rotation of the casing 2. Reference numeral 35 designates a bush.

When the tool holder having the above construction is used with a machining center for tapping, the pitch of the female thread 10 formed at the top end portion of the rotary holder 9 is set equal to the pitch of a thread to be formed. More specifically, a cutter blade mounted in the chuck 32 is rotated with the rotation of the main shaft 3 of the machining center and is also caused to undergo swinging at a high speed in the lead angle direction of the female thread 10, while effecting height direction feed of the machining center in correspondence to the pitch of the thread to be obtained. Boring is performed in a manner similar to tapping. In this case, however, there is no need to take the pitch of the female thread 10 into consideration.

Figure 2:
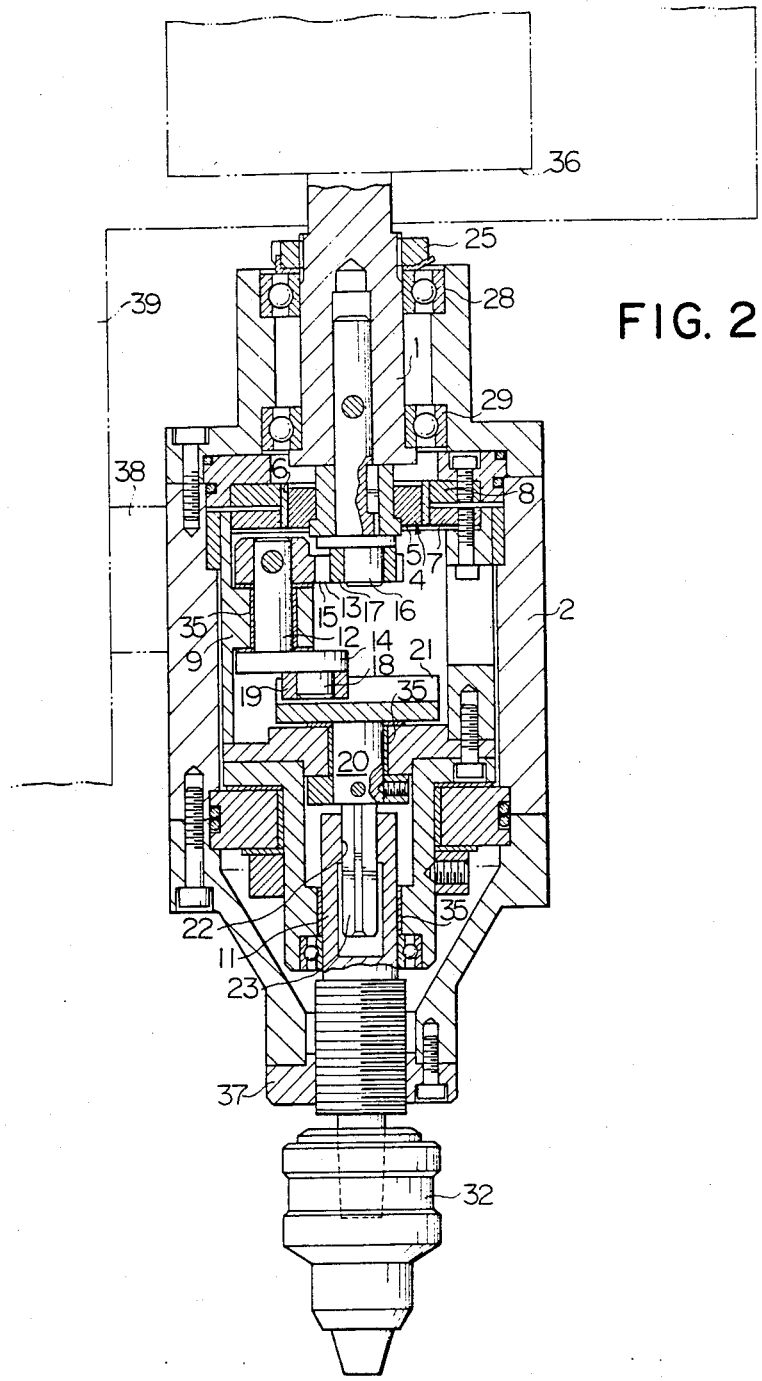
FIG. 2 is an axial sectional view showing another embodiment of the present invention.
Figure 3:
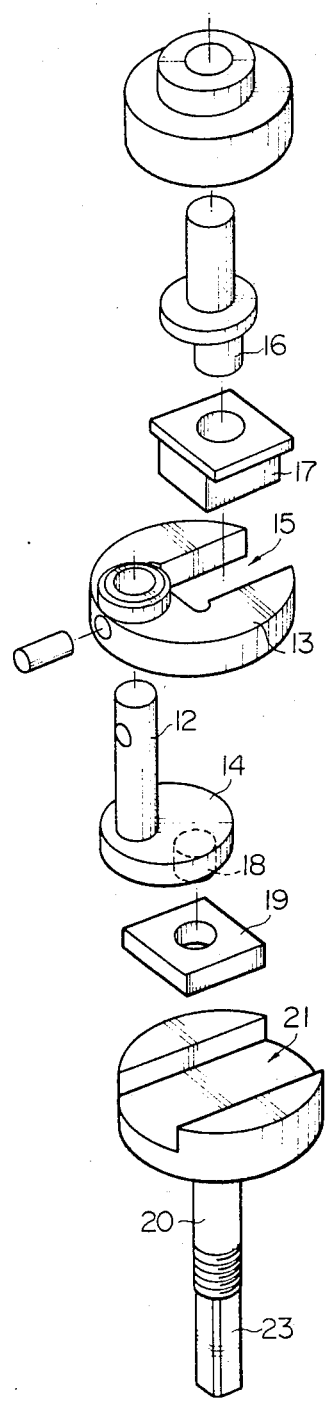
FIG. 3 is an exploded perspective view showing part of the embodiment of FIG. 1.

FIG. 2 shows a different embodiment of the invention, which is used for a tapping machine and a reaming machine. The basic structure of this embodiment is the same as the preceding embodiment shown in FIG. 1. Parts shown in FIG. 2 like those shown in FIG. 1, therefore, are designated by like reference numerals, and their detailed description is omitted. Only a different part of the structure will be described.

A prime shaft 1 is connected either directly or indirectly to a motor 36 provided in the machine body 39 of a tapping machine or a reaming machine and is rotated by receiving rotation of the motor 36. A tool holder mounting shaft 11 is rotatably supported by the top end of a rotary holder 9 around its axis and is movably supported thereby in its axial direction, and its end portion projects from a casing 2. A top end portion of the casing 2 is formed with a female thread 37 which is coaxial with the prime shaft 1. The tool holder mounting shaft 11 is threaded to the female thread 37.

When the prime shaft 1 is rotated, the rotary holder 9 which is secured to a circular spline 7 as an output section of a speed reduction unit 4 is rotated at a predetermined reduced speed. The rotation of the rotary holder 9 causes rotation of the tool holder mounting shaft 11 about its axis through a crankshaft 12, a crank arm 14 and a motion transmission shaft 20. Since the tool holder mounting shaft 11 which is rotated in this way is screwed in the female thread 37 of the top end portion of the casing 2, the tool holder mounting shaft 11 is moved in an axial direction in correspondence to the pitch of the female thread 37 with its rotation. More specifically, the tool holder mounting shaft 11 is moved back and forth in the axial direction while it is rotated in the same directions as the forward and reverse rotation of the motor 36. At the same time, rotation of a wave generator 5, which is rotated at a high speed by receiving the high speed rotation of the prime shaft 1, causes a high speed swinging motion of the tool holder mounting shaft 11 in its circumferential direction through the crank arm 13, crankshaft 12, crank arm 14 and motion transmission shaft 20. In consequence, the tool holder mounting shaft 11 advances in the axial direction during a forward run and retreats during a reverse run, while it is slowly rotated by receiving the rotation of the rotary holder 9. The shaft 11 thus swings at a high speed along an angular extension 23 of the motion transmission shaft 20 in the lead angle direction of the female thread 37.

Reference numeral 38 designates a securement member to secure the present invention to the machine body 39. The securement member 38 also serves as rotation prevention member to prevent rotation of the casing 2.

When the tool holder having the above construction is used with a tapping machine for tapping, the pitch of the female thread 10 provided in the top end portion of the casing 2 is set to be equal to the pitch of the thread to be formed. When the tool holder is used for a reaming machine for boring, no consideration need be given to the pitch of the female thread 10.

The control of the position of the tool holder mounting shaft 11, which is advanced and retreated while being rotated, may be done while counting the revolving rate with a counter. Furthermore, a limit switch may be provided at the limit of advancement and also at the limit of the retreat.

As has been described in the foregoing description, according to the invention smooth rotation and swinging of the cutter blade can be obtained. In addition, since the speed reduction unit according to the invention can provide a large speed reduction ratio, a large speed difference can be provided between the rotation and swinging, so that it is possible to obtain very effective effects with the swinging cutting theory. Furthermore, the construction is simple, so that it is possible to obtain size reduction and weight reduction and also permit easy handling. Furthermore, since the prime shaft and cutter blade are coaxial, the invention is applicable to a machining center as well as to a tapping machine and a reaming machine. Thus, according to the invention it is possible to obtain excellent effects with a variety of tool holders.

What is claimed is:

1. A tool holder comprising
   a casing;
   a rotatable prime shaft extending within said casing for rotating therein when subjected to an external torque;
   a speed reduction unit operatively connected to said prime shaft within the casing, said speed reduction unit having an input section at which the rotation of said prime shaft is input and an output section at which the rotation of the prime shaft is transmitted at a rate that is less than that input at said input section;
   a rotary holder fixed to the output section of said speed reduction unit for rotating when the rotation of said prime shaft is transmitted thereto via the output section of said speed reduction unit;
   a tool holder mounting shaft coaxial with said prime shaft, said tool holder mounting shaft operatively connected to and movable with respect to said rotary holder within said casing for rotating with the rotation of said rotary holder, and said tool holder mounting shaft having a top end portion projecting from said casing;
   engaging means operatively engaged with said tool holder mounting shaft for causing said tool holder mounting shaft to advance and retreat in a direction extending along the longitudinal axis thereof when the tool holder mounting shaft is alternately rotated clockwise and counterclockwise about the longitudinal axis thereof; and
   swinging means carried by said rotary holder so as to be rotated therewith, said swinging means for oscillating in response to the rotation of the prime shaft while being rotated with the rotary holder, said swinging means operatively connected to said tool holder mounting shaft for causing said tool holder mounting shaft to alternately rotate clockwise and counterclockwise about its longitudinal axis so as to advance and retreat when the swinging means oscillates such that the rotation of said prime shaft transmitted through said speed reduction unit to said rotary holder and swinging means carried thereby causes said tool holder mounting shaft to rotate and to advance and retreat in a direction extending along the longitudinal axis of the tool holder mounting shaft.

2. The tool holder as claimed in claim 1,
   wherein said tool holder mounting shaft has a threaded portion, and said engaging means comprises a female threaded portion on said rotary holder mated with said threaded portion of the tool holder mounting shaft.

3. The tool holder as claimed in claim 1,
   wherein said tool holder mounting shaft is rotatably mounted to said rotary holder and has a threaded portion extending therefrom, and said engaging means comprises a female threaded portion on said casing mated with said threaded portion of the tool holder mounting shaft.

4. The tool holder as claimed in claim 1,
   wherein said speed reduction unit comprises a coaxial three-layer structure consisting of a wave generator connected to said prime shaft, a flexible spline surrounding the wave generator and a circular spline surrounding and engaging said flexible spline, one of said flexible spline and said circular spline is fixed relative to said casing, and said output section comprises the other of said flexible spline and said circular spline.

5. The tool holder as claimed in claim 1,
   wherein said swinging means comprises a rotatable crankshaft rotatably mounted to said rotary holder at an inner wall portion thereof and extending at a position that is eccentric to said prime shaft, a first crank arm operatively connected to and extending between one end of said crankshaft and said input section for rotating said crankshaft about its longitudinal axis when the rotation of said prime shaft is input to the speed reduction unit, and a second crank arm operatively connected to and extending between the other end of said crankshaft and said tool holder mounting shaft.

6. The tool holder as claimed in claim 4, wherein said swinging means comprises a rotatable crankshaft rotatably mounted to said rotary holder at an inner wall portion thereof and extending at a position that is eccentric to said prime shaft, a first crank arm operatively connected to and extending between one end of said crankshaft and said wave generator for rotating said crankshaft about its longitudinal axis when the rotation of said prime shaft is input to the speed reduction unit, and a second crank arm operatively connected to and extending between the other end of said crankshaft and said tool holder mounting shaft.

* * * * *